Figures 1, 2:
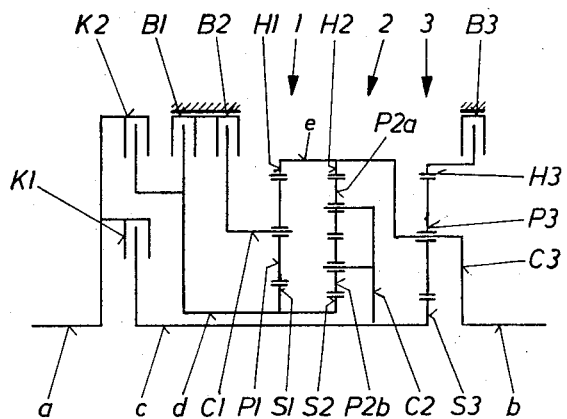

United States Patent [19]
Ott

[11] 3,820,418
[45] June 28, 1974

[54] PLANETARY-GEAR TRANSMISSION FOR AUTOMOTIVE VEHICLES

[75] Inventor: Anton Ott, Friedrichshafen, Germany

[73] Assignee: Zahnradfabrik Friedrichshafen Aktiengesellschaft, Friedrichsfafen, Germany

[22] Filed: Aug. 21, 1972

[21] Appl. No.: 282,552

[30] Foreign Application Priority Data
Aug. 19, 1971 Germany.............................. 2141563

[52] U.S. Cl................................. 74/759, 74/763
[51] Int. Cl............................................. F16h 57/10
[58] Field of Search...................... 74/753, 759, 763

[56] References Cited
UNITED STATES PATENTS
| | | | |
|---|---|---|---|
| 2,856,794 | 10/1958 | Simpson | 74/763 |
| 3,580,109 | 5/1971 | Hill | 74/763 |
| 3,593,599 | 7/1971 | Dach | 74/759 X |
| 3,714,849 | 2/1973 | Smith | 74/759 X |

*Primary Examiner*—Samuel Scott
*Assistant Examiner*—Parshatam S. Lall
*Attorney, Agent, or Firm*—Karl F. Ross; Herbert Dubno

[57] ABSTRACT

An automotive transmission has three cascaded planetary gear trains, the first two gear trains having two interconnected or unitary sun gears and further having two interconnected or unitary ring gears rigid with the planet carrier of the third gear train and with an output shaft. A first clutch K1 connects an input shaft with the second planet carrier in any of four forward speeds while a second clutch K2 connects that shaft with the two paired sun gears in fourth gear (direct drive) and in either of two reverse speeds. Three brakes B1, B2, B3 serve to arrest the two paired sun gears, the first planet carrier or the third ring gear. The first planet carrier supports one set of planet gears whereas the second planet carrier supports two sets of planet gears meshing with each other.

4 Claims, 2 Drawing Figures

|     | K1 | K2 | B1 | B2 | B3 |
|-----|----|----|----|----|----|
| I   | ×  |    |    |    | ×  |
| II  | ×  |    |    | ×  |    |
| III | ×  |    | ×  |    |    |
| IV  | ×  | ×  |    |    |    |
| R'  |    | ×  |    |    | ×  |
| R"  |    | ×  |    | ×  |    |

PLANETARY-GEAR TRANSMISSION FOR AUTOMOTIVE VEHICLES

My present invention relates to an automotive transmission of the type wherein an input shaft, driven by the vehicular engine (generally with intervention of a fluid coupling), is operatively connectable with an output shaft (leading to the traction wheels of the vehicle) through several cascaded planetary gear trains with the aid of selectively actuatable clutches and brakes.

In commonly owned U.S. Pat. No. 3,580,109, issued in the name of Franz Hill, there has been disclosed a system of this type adapted to establish three forward speeds ("first gear," "second gear" and "third gear") and one reverse speed with the aid of two planetary gear trains whose sun gears and whose ring gears are rigidly interconnected.

The object of the present invention is to provide a modified transmission of this type designed to increase the number of available speeds so as to make the system suitable for use in heavy-duty vehicles such as local and intercity buses, caterpillar tractors, trucks and bulldozers as well as cars equipped with gas-turbine engines.

This object is realized, pursuant to my present invention, by the provision of a third planetary gear train, the planet carrier of the latter being rigid with the output shaft of the transmission as well as with the interconnected ring gears of the first two planetary gear trains.

Two clutches and two brakes, actuatable in the same manner as the above-identified Hill patent, establish a low-speed, an intermediate-speed and a high-speed position (referred to hereinafter as "second gear," "third gear" and "fourth gear") as well as a reverse position; by the present improvement, I am able to add a "first gear" position of very large step-down ratio as well as another reverse position differing in speed ratio from the first one.

Not only the first two ring gears but, advantageously, also the third ring gear may have the same diameter, with identical numbers of teeth, to simplify the design and to provide a more compact construction. If desired, the associated sun gears may also be of like character and have the same number of teeth; however, changes in the size of especially the second sun gear make it possible to vary the overall speed ratio over a wide range.

The invention will now be described in detail with reference to the accompanying drawing in which:

FIG. 1 is a diagrammatic view of a transmission embodying my present improvement; and FIG. 2 is a chart giving the various gear positions for different combinations of actuated clutches and brakes.

In conformity with conventional diagrammatic representation, and in line with the showing of the above-identified Hill patent, FIG. 1 shows only those parts of the planetary gear trains which lie above the common axis of the several clutches and gears.

The system comprises an input shaft $a$ driven from an engine shaft via a hydraulic torque converter, not shown, as is well known in the art. Two hydraulic clutches K1, K2 are individually actuatable to couple the shaft $a$ with an intermediate shaft $c$ or with a surrounding tubular shaft $d$. Clutch K1 is invariably actuated for each of the four forward speeds ("first gear," "second gear," "third gear" and "fourth gear"); clutch K2 is actuated for "fourth gear" (direct drive) as well as for reverse driving.

For "third gear" shaft $d$ can be arrested by a first hydraulic brake B1 mounted on the gear housing, a second such brake B2 being engageable with the body of a first planet carrier C1 to arrest that carrier for establishing either "second gear" and a reverse speed, depending on which clutch has been operated. Carrier C1 is part of a first gear train 1 including a sun gear S1 rigid with shaft $d$, a ring gear H1 and a set of planet gears P1 (only one shown) meshing with both the sun gear and the ring gear. A second planetary gear train 2 includes a ring gear H2 unitary with ring gear H1 as diagrammatically illustrated by a link $e$, a sun gear S2 unitary with gear S1 and therefore rigid with shaft $d$, a planet carrier C2 rigid with intermediate shaft $c$ and two sets of meshing planet gears P2$a$ and P2$b$, only one gear of each set being visible.

The structure $e$ interconnecting the two ring gears H1 and H2 is also rigid with an output shaft $b$ as well as with a planet carrier C3 forming part of a third gear train generally similar to the first one, this third planetary gear train 3 including a sun gear S3 rigid with shaft $c$, a ring gear H3 and a set of planet gears P3 (only one shown) meshing with the associated sun and ring gears. It will be noted that all three ring gears H1, H2 and H3 have the same radius.

A third brake B3 is engageable with ring gear H3 to establish either "first gear" or another reverse position.

Simultaneous actuation of clutches K1 and K2, with all brakes released, locks the first and second planetary gear trains against relative motion of their components so that output shaft $b$ is directly entrained by input shaft $a$.

FIG. 2 shows the four forward speeds I, II, III, IV as well as the two reverse speeds R' and R" obtainable with the present system. It will be noted that reverse speed R' results from simultaneous actuation of clutch K2 and brake B3 whereas reverse speed R" is obtained by simultaneously actuating clutch K2 and brake B2.

In a manner well known per se, as discussed in the aforementioned Hill patent, brakes B1 and B2 may be supplemented by overrunning clutches or freewheels for smoother shifting.

Planet gears P2$b$, whose position relative to planet gears P2$a$ is as shown in the Hill patent, may be relocated on their carrier C2 without any other structural changes if a sun gear S2 of different dimensions is substituted to alter the speed ratios.

Calculations shows that the fifth position (R' in FIG. 2) reverses the sense of rotation if the tooth ratios between the ring and sun gears of the second and third planetary gear trains are both greater than 2 (as shown in FIG. 1) but that it is also possible, with different tooth ratios, to obtain a fifth forward speed by simultaneous actuation of clutch K1 and brake B3.

I claim:

1. An automotive transmission for providing a plurality of speed ratios between an engine-driven input shaft and an output shaft, comprising:

a first planetary gear train which a first sun gear, a first ring gear and a first planet carrier having a first planet gear in driving engagement with said first sun and ring gears;

a second planetary gear train with a second sun gear, a second ring gear and a second planet carrier having a pair of intermeshing second planet gears in driving engagement with said second sun gear and said second ring gear, respectively, said first sun gear being coaxial and rigid with said second sun gear, said first ring gear being coaxial and rigid with said second ring gear and fixedly connected with said output shaft;

a third planetary gear train with a third sun gear, a third ring gear and a third planet carrier having a third planet gear in driving engagement with said third ring and sun gears, said third sun gear being rigid with said second planet carrier, said third planet carrier being rigid with said output shaft;

first clutch means actuatable for operatively coupling said input shaft with said second planet carrier to help establish a first, a second, a third and a fourth position representing different forward speed ratios of said shafts;

second clutch means actuatable for operatively coupling said input shaft with said first and second sun gears to establish said fourth position in the actuated state of such first clutch means;

first brake means actuatable for arresting said first and second sun gears to establish said third position in the actuated state of said first clutch means;

second brake means actuatable for arresting said first planet carrier to establish said second position in the actuated state of said first clutch means; and third brake means actuatable for arresting said third ring gear to establish said first position in the actuated state of said first clutch means, said third brake means being also actuatable jointly with said clutch means in the unactuated state of said first clutch means to establish a fifth position representing an additional speed ratio.

2. A transmission as defined in claim 1 wherein said first, second and third ring gears have equal numbers of teeth.

3. A transmission as defined in claim 1 wherein said second brake means is actuatable in the actuated state of said second clutch means and in the unactuated state of said first clutch means to establish a sixth position with reverse speed ratio.

4. A transmission as defined in claim 1 wherein said additional speed ratio is of negative sign.

* * * * *